(12) United States Patent
Dumov

(10) Patent No.: US 11,097,690 B2
(45) Date of Patent: Aug. 24, 2021

(54) IDENTIFYING AND AUTHENTICATING AUTONOMOUS VEHICLES AND PASSENGERS

(71) Applicant: Motional AD LLC, Boston, MA (US)

(72) Inventor: Leo Dumov, Los Gatos, CA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/458,935

(22) Filed: Jul. 1, 2019

(65) Prior Publication Data

US 2020/0010051 A1 Jan. 9, 2020

Related U.S. Application Data

(60) Provisional application No. 62/694,413, filed on Jul. 5, 2018.

(51) Int. Cl.
*H04W 4/40* (2018.01)
*H04W 4/02* (2018.01)
(Continued)

(52) U.S. Cl.
CPC ............ *B60R 25/252* (2013.01); *B60R 25/25* (2013.01); *B60R 25/255* (2013.01);
(Continued)

(58) Field of Classification Search
CPC ... B60R 25/252; B60R 25/255; B60R 25/257; B60R 2300/8006; B60R 25/24;
(Continued)

(56) References Cited

U.S. PATENT DOCUMENTS 3,883,843 A 5/1975 Telmet
5,519,260 A 5/1996 Washington
(Continued)

FOREIGN PATENT DOCUMENTS

| KR | 2016-0088264 | 7/2016 |
|----|--------------|--------|
| KR | 101850741 | 4/2018 |
| WO | WO2017079222 | 5/2017 |

OTHER PUBLICATIONS

European Extended Search Report in European Application No. 19184136, dated Aug. 1, 2019, 12 pages.
(Continued)

*Primary Examiner* — Dionne Pendleton
(74) *Attorney, Agent, or Firm* — Fish & Richardson P.C.

(57) ABSTRACT

A method comprising receiving, by a vehicle computer, first information specifying a user, a time, and a location, the first information received by the vehicle computer from a first communication channel; causing the vehicle to navigate to the geographic location so as to arrive at the specified location; at the geographic location: receiving, by the vehicle computer, second information identifying the individual, time and location, the second information received over a second communication channel different than the first communication channel, the second information sent by a mobile device at the location; comparing, by the vehicle computer, the first information and the second information; and responsive to the comparing, causing, by the vehicle computer, one or more doors of the vehicle to unlock or open.

44 Claims, 8 Drawing Sheets

(51) Int. Cl.

| | |
|---|---|
| *G05D 1/00* | (2006.01) |
| *B60R 25/25* | (2013.01) |
| *G06K 9/00* | (2006.01) |
| *G08G 1/00* | (2006.01) |
| *H04W 4/48* | (2018.01) |
| *G05D 1/02* | (2020.01) |
| *G06F 16/29* | (2019.01) |
| *H04W 4/44* | (2018.01) |
| *G01C 21/00* | (2006.01) |

(52) U.S. Cl.
CPC ......... *B60R 25/257* (2013.01); *G01C 21/005* (2013.01); *G05D 1/0011* (2013.01); *G05D 1/0088* (2013.01); *G05D 1/0285* (2013.01); *G06F 16/29* (2019.01); *G06K 9/00087* (2013.01); *G06K 9/00288* (2013.01); *G06K 9/00617* (2013.01); *G08G 1/202* (2013.01); *H04W 4/44* (2018.02); *H04W 4/48* (2018.02); *G05D 2201/0212* (2013.01)

(58) Field of Classification Search
CPC ....... B60R 25/305; B60R 25/31; B60R 25/25; G06K 9/00087; G06K 9/00288; G06K 9/00617; G06K 9/00832; G06K 9/00791; G06K 9/00006; G08G 1/202; G08G 1/133; B60W 2540/22; B60W 2540/221; B60W 60/00253; G01C 21/3407; G01C 21/005; G06Q 10/00; G06Q 10/02; G06Q 10/06; G06Q 50/30; H04W 4/02; H04W 4/029; H04W 4/40; H04W 4/44; H04W 4/48; G07C 1/10; G07C 9/00; G07C 9/37; H04L 67/22; G05D 1/0011; G05D 2201/0212; G05D 1/0285; G05D 1/0088; G06F 16/29

See application file for complete search history.

(56) References Cited

U.S. PATENT DOCUMENTS

| | | | | |
|---|---|---|---|---|
| 10,349,223 | B1* | 7/2019 | Yoo | G06Q 50/30 |
| 10,482,226 | B1* | 11/2019 | Konrardy | G08G 1/166 |
| 2007/0132950 | A1 | 6/2007 | Victor | |
| 2013/0317693 | A1 | 11/2013 | Jefferies | |
| 2014/0309806 | A1 | 10/2014 | Ricci | |
| 2015/0339928 | A1* | 11/2015 | Ramanujam | G06Q 50/30 |
| | | | | 701/23 |
| 2016/0301698 | A1 | 10/2016 | Katara | |
| 2017/0115125 | A1 | 4/2017 | Outwater et al. | |
| 2017/0132934 | A1 | 5/2017 | Kentley et al. | |
| 2017/0137032 | A1 | 5/2017 | Wuthnow | |
| 2017/0147959 | A1 | 5/2017 | Sweeney | |
| 2017/0153714 | A1 | 6/2017 | Gao et al. | |
| 2017/0294130 | A1 | 10/2017 | Donnelly | |
| 2017/0327082 | A1 | 11/2017 | Kamhi | |
| 2018/0048769 | A1 | 2/2018 | Alshinnawi et al. | |
| 2018/0074494 | A1 | 3/2018 | Myers | |
| 2018/0074495 | A1 | 3/2018 | Myers | |
| 2018/0075754 | A1 | 3/2018 | Salter et al. | |
| 2018/0120123 | A1* | 5/2018 | Seok | B60L 58/12 |
| 2018/0136655 | A1 | 5/2018 | Kim et al. | |
| 2018/0188731 | A1* | 7/2018 | Matthiesen | G05D 1/0088 |
| 2018/0236975 | A1* | 8/2018 | Myers | G06K 9/00288 |
| 2019/0041223 | A1* | 2/2019 | Yang | H04W 12/122 |
| 2019/0172279 | A1* | 6/2019 | Al-Shaikh | G07C 1/10 |
| 2019/0188493 | A1* | 6/2019 | Tiziani | B60W 50/0098 |
| 2019/0318159 | A1* | 10/2019 | Blanc-Paques | G06K 9/00288 |
| 2020/0008061 | A1* | 1/2020 | Schroeder | G06Q 10/02 |
| 2020/0238953 | A1* | 7/2020 | Spasovski | G06K 9/00791 |

OTHER PUBLICATIONS

Hayashi et al., "Carsharing and IT Enabled Services", Annual SRII Global Conference, IEEE, pp. 274-280, 2014.
DK 1rst Technical Examination Report in Danish Appln. No. PA201870683, dated Jan. 21, 2019, 9 pages.
DK 2nd Technical Examination Report in Danish Appln. No. PA201870683, dated Jul. 8, 2019, 3 pages.
DK 3rd Technical Examination Report in Danish Appln. No. PA201870683, dated Jun. 4, 2020, 3 pages.
DK 4th Technical Examination Report in Danish Appln. No. PA 2018 70683, dated Feb. 8, 2021, 3 pages.

* cited by examiner

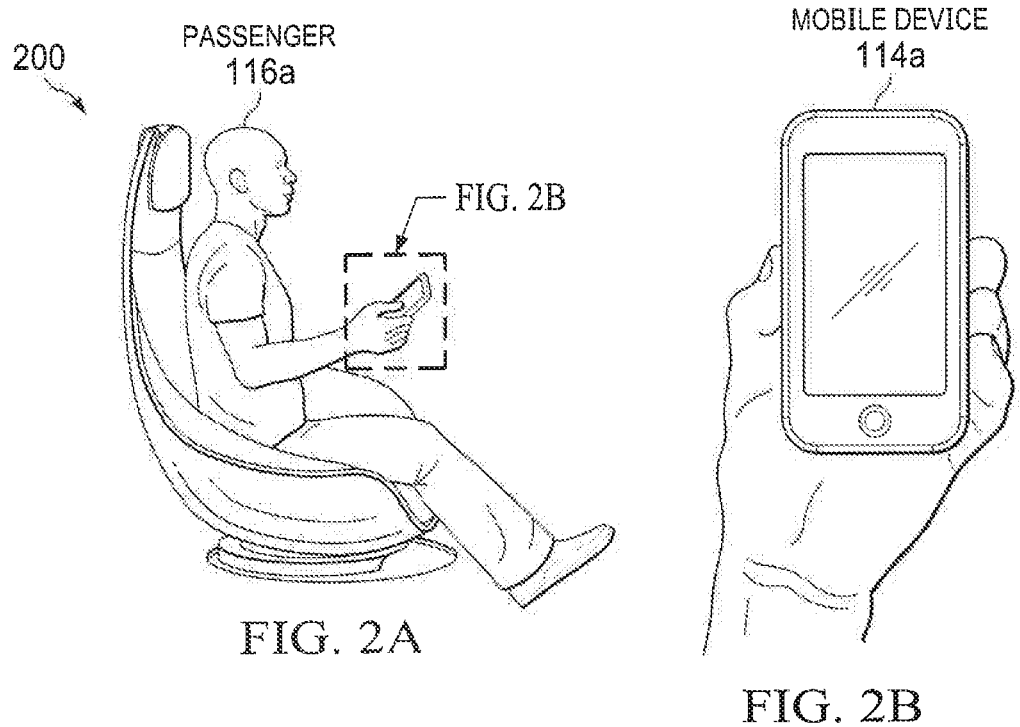
FIG. 2A
FIG. 2B
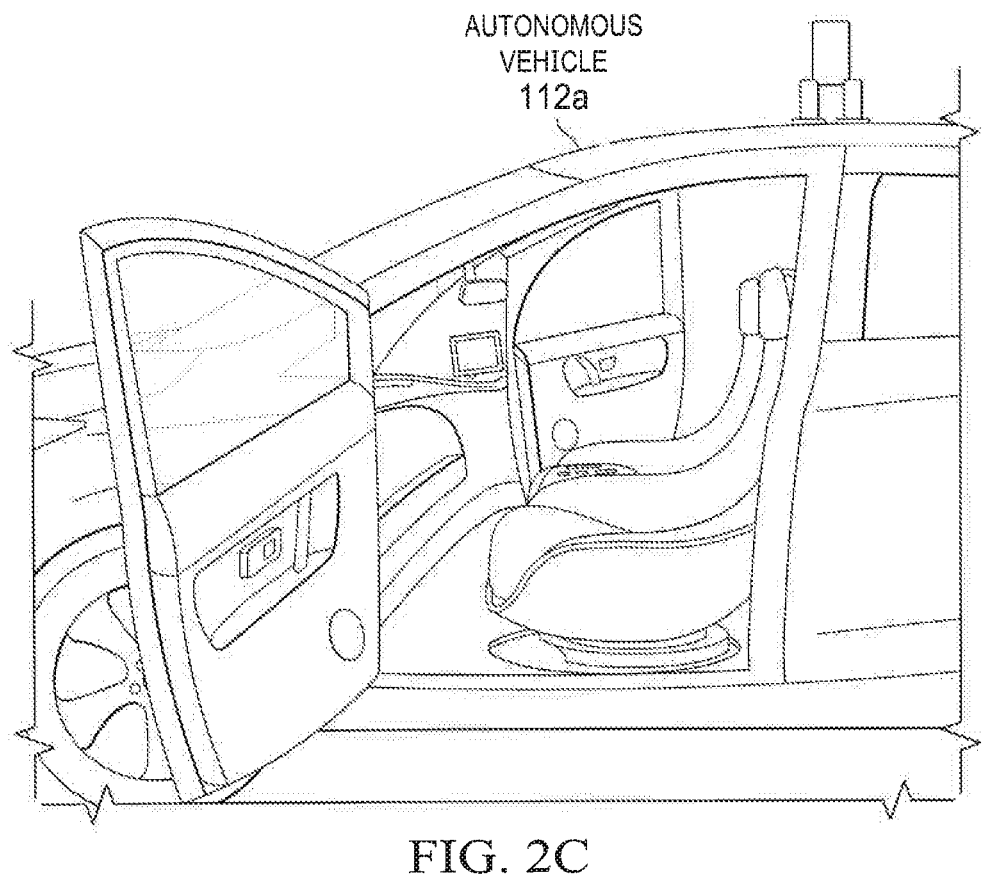
FIG. 2C

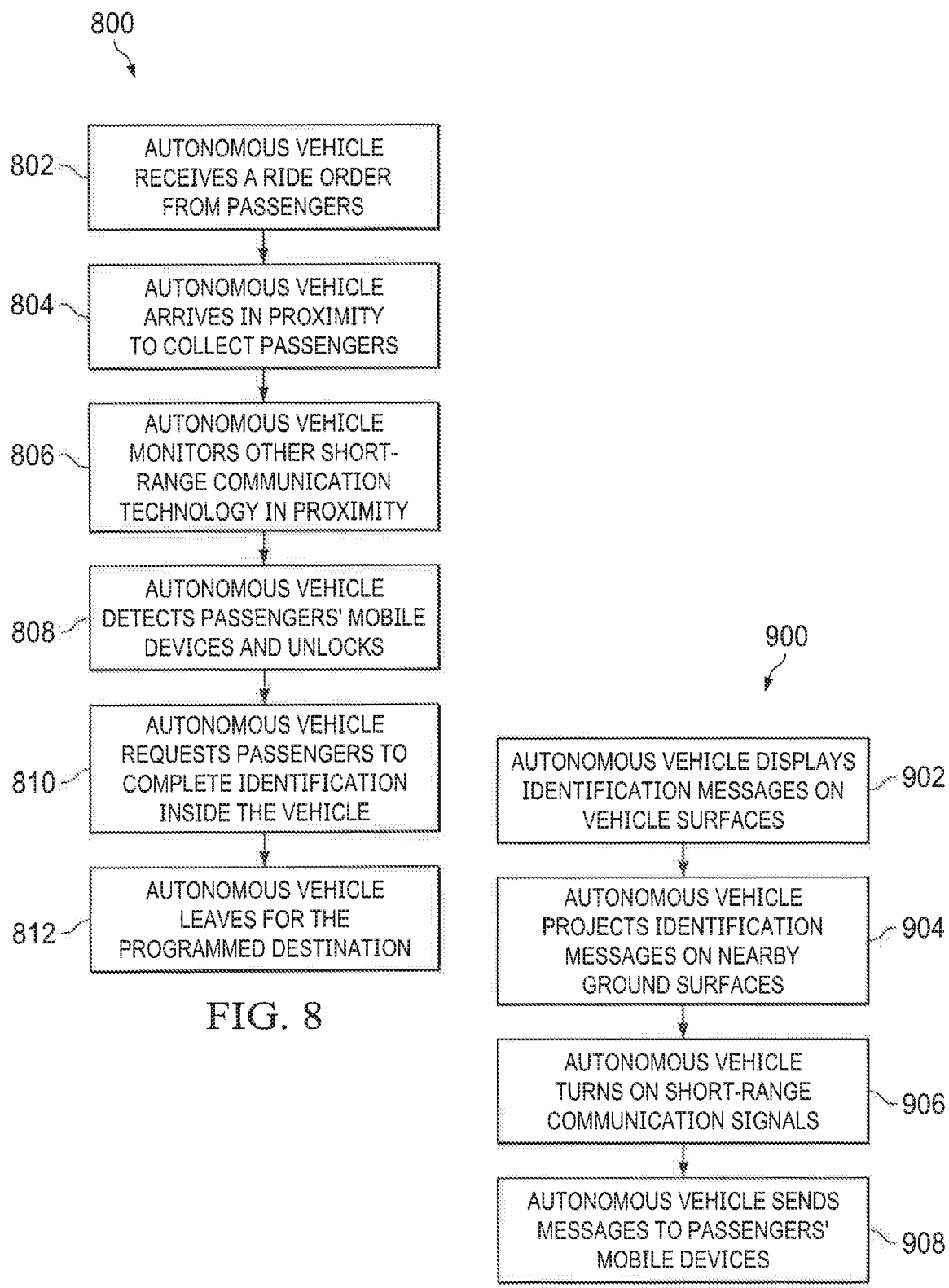

IDENTIFYING AND AUTHENTICATING AUTONOMOUS VEHICLES AND PASSENGERS

CROSS-REFERENCE TO RELATED APPLICATIONS

This application claims priority to U.S. Provisional Patent Application No. 62/694,413, filed Jul. 5, 2018, the entire contents of which are incorporated herein by reference.

TECHNICAL FIELD

This disclosure relates generally to autonomous vehicles.

BACKGROUND

Autonomous shared vehicle services are set to transform the landscape of mass transit systems. The autonomous shared vehicle services could potentially offer fares at a fraction of the cost of those offered by public transport networks today, and also change the city landscape by dramatically reducing the number of cars on the roads and the number of parking lots and structures. The world's first self-driving taxis were debuted in Singapore in 2016, and it is widely anticipated that autonomous shared vehicle services will be fully operational in many cities throughout the world in the next few years.

SUMMARY

The disclosed embodiments are directed to identifying and authenticating autonomous shared vehicles.

Techniques are provided for receiving, by a vehicle computer, first information specifying a user, a time, and a location, the first information received by the vehicle computer from a first communication channel; causing the vehicle to navigate to the geographic location so as to arrive at the specified location; at the geographic location: receiving, by the vehicle computer, second information identifying the individual, time and location, the second information received over a second communication channel different than the first communication channel, the second information sent by a mobile device at the location; comparing, by the vehicle computer, the first information and the second information; and responsive to the comparing, causing, by the vehicle computer, one or more doors of the vehicle to unlock or open. One or more embodiments of the disclosed mobility service platform provide one or more of the following advantages.

An autonomous shared vehicle can display a message that makes it easy for a passenger to identify the right vehicle. The messages can be displayed on a large amount of surface areas of the autonomous vehicle or otherwise optimized for maximum visibility. The autonomous shared vehicle can authenticate passengers in a manner that is secure and convenient. The use of short-range communication signals enables relative accuracy in identifying a passenger and vehicle. The use of a multi-stage authentication process enables passenger safety and mitigates against unauthorized vehicle access.

The details of the disclosed implementations are set forth in the accompanying drawings and the description below. Other features, objects, and advantages are apparent from the description, drawings, and claims.

DESCRIPTION OF DRAWINGS

FIGS. 2A-2C show an example process for requesting an autonomous vehicle by a passenger, according to an embodiment.

FIG. 8 is an example process for multiple-stage passenger identification, according to an embodiment.

FIG. 9 is an example process for a passenger to identify a vehicle at a pickup location, according to an embodiment.

The same reference symbol used in various drawings indicates like elements.

DETAILED DESCRIPTION

Figure 1:
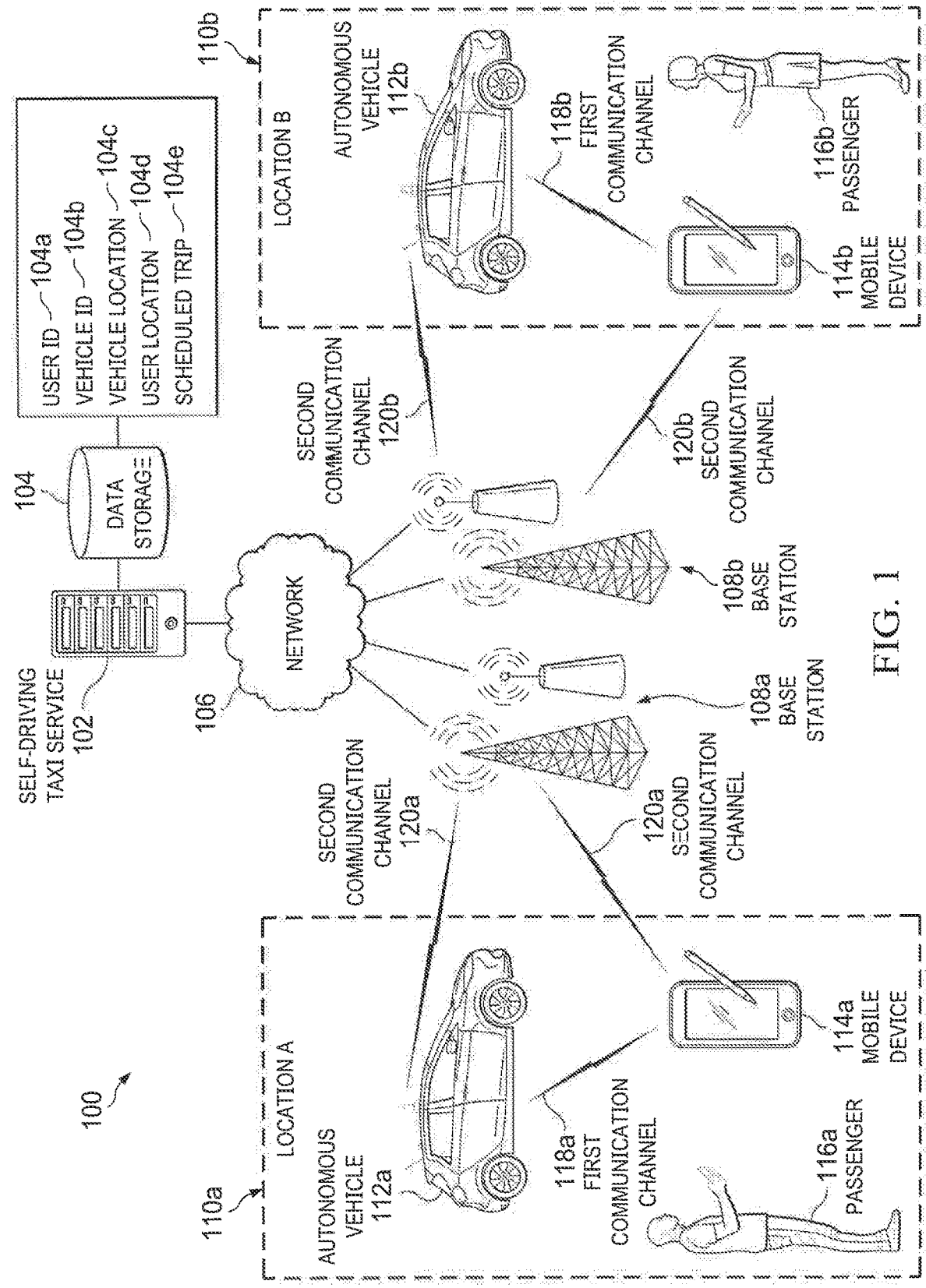
FIG. 1 is a block diagram of a system for implementing an autonomous vehicle taxi service, according to an embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In order to match an autonomous vehicle to the right passenger, the autonomous vehicle can identify itself to the passengers and receive identification information to authenticate the passengers.

For example, the autonomous vehicle can display information such as the passenger's identity on the autonomous vehicle's outer surface and/or project such messages onto nearby ground surfaces. Another example includes the use of short-range communication technology such as Bluetooth. For example, the passenger can use a mobile device to scan for the Bluetooth signal from the autonomous vehicle.

Further, the autonomous vehicle can communicate directly with the passenger's mobile device using short-range communication technology in order to identify the passenger and authorize him/her to enter the vehicle. The autonomous vehicle can receive passenger identification information such as the mobile device's MAC address, a passcode, the passenger's biometric information, etc. The autonomous vehicle can then authenticate passengers by comparing the received information with that sent by a remote entity such as a reservation cloud service.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements are not shown in the drawings so as not to obscure the disclosure. In addition, for ease of illustration, a single connecting element is used to represent multiple connections, relationships or associations between elements. For example, where a connecting element represents a communication of signals, data or instructions, it should be understood by those skilled in the art that such element represents one or multiple signal paths (e.g., a bus), as may be needed, to affect the communication.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification. Embodiments are described herein according to the following outline:

1. System Overview
2. Example Processes
3. Example Autonomous Vehicle System
4. Example Mobile Device Architecture System Overview As used herein, the term "autonomous capability" refers to a function, feature, or facility that enables a vehicle to be operated without real-time human intervention unless specifically requested by the vehicle.

As used herein, an autonomous vehicle (AV) is a vehicle that possesses autonomous capability.

As used herein, "vehicle" includes means of transposition of goods or people. For example, cars, buses, trains, airplanes, drones, trucks, boats, ships, submersibles, dirigibles, etc. A driverless car is an example of an AV.

FIG. 1 is a block diagram of a system 100 for requesting an autonomous shared vehicle by a passenger, according to an embodiment. System 100 includes autonomous shared vehicle service 102, data storage 104, network 106, base stations 108a and 108b. At a first location 110a, passenger 116a uses mobile device 114a to request autonomous vehicle 112a. At a second location 110b, passenger 116b uses mobile device 114b to request autonomous vehicle 112b. Since the operations at multiple respective locations (e.g., the first location 110a and the second location 110b) work similarly, the description below will be based on operations occurring at a single location (e.g., the first location 110a) only.

Passenger 116a uses mobile device 114a to request autonomous vehicle 112a. For example, mobile device 114a can include a client application that collects passenger 116a's trip information such as passenger identity, departure location, destination, scheduled departure time, payment information, number of passengers, etc. Mobile device architecture is described in more detail below with respect to FIG. 7.

Mobile device 114a sends the collected trip information to autonomous shared vehicle service 102 using network 106. For example, mobile device 114a can first connect to local base station 108a using second communication channel 120a. Second communication channel 120a can be any suitable cellular communication channels such as 2 G, 3 G, 4 G, 802.11 (Wifi), IEEE 802.16 (WiMAX), etc. After local base station 108a receives the trip information, it then sends the information using network 106 to autonomous shared vehicle service 102. For example, network 106 can be an interconnected computer network such as the Internet.

Autonomous shared vehicle service 102 is a server-side program that receives, stores, and processes the trip information. For example, autonomous shared vehicle service 102 can store, in data storage 104, data related to the requested trip. In addition, data storage 104 can store data related to the fleet of autonomous vehicles in operation. Example data include user ID 104a, vehicle ID 104b, vehicle location 104c, user location 104d, scheduled trip 104e, etc.

Autonomous shared vehicle service 102 selects one of the autonomous vehicles, e.g., autonomous vehicle 112a based on its availability and proximity to passenger 116a, and dispatches vehicle 112a to meet passenger 116a at the requested location and time. For example, autonomous shared vehicle service 102 can send the trip information to autonomous vehicle 112a. Autonomous vehicle 112a can receive and send data using network 106 and base station 108a. For example, once autonomous vehicle 112a receives the trip information, the autonomous vehicle 112a can communicate with mobile device 114a using autonomous shared vehicle service 102. As a result, passenger 116a and autonomous vehicle 112a can maintain real-time information of each other such as the current location of each other and estimated arrival time. Details of autonomous vehicle architecture are described below with respect to FIG. 6.

Once autonomous vehicle 112a arrives, it sends an alert to mobile device 114a. For example, the alert can include one or both of the autonomous vehicle 112a's location and the maximum waiting time. In some examples, in order to board autonomous vehicle 112a, passenger 116a identifies him/herself and authenticates with the vehicle. For example, passenger 116a can use mobile device 114a to directly communicate with autonomous vehicle 112a using first communication channel 118a, e.g., a relatively short-range protocol such as Bluetooth or Near-Field Connection. Passenger 116a can send certain identification information such as the passenger's ID to autonomous vehicle 112a using first communication 118a. Autonomous vehicle 112a will then compare this information with that stored in data storage 104, and if a match is found, will allow passenger 116a to board the vehicle.

In some implementations, autonomous vehicle 112a picks up multiple passengers as parts of each passenger's trip overlaps.

Figure 3:
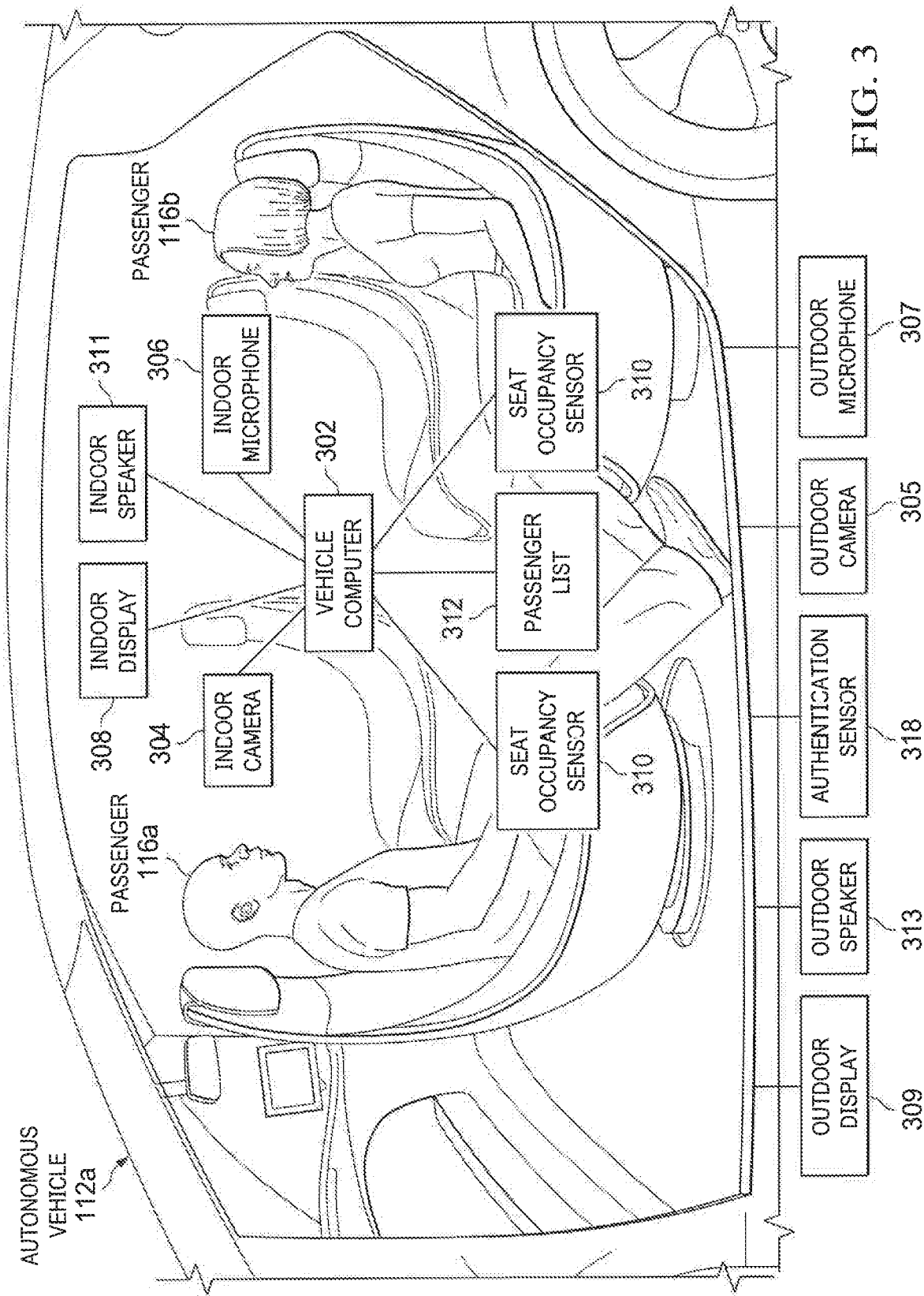
FIG. 3 is an example autonomous vehicle, according to an embodiment.

FIG. 3 is an example autonomous vehicle 112a, according to an embodiment. Various input/output devices are located on the interior and exterior of autonomous vehicle 112a, including but not limited to: indoor camera 304, outdoor camera 305, indoor microphone 306, outdoor microphone 307, indoor display 308, outdoor display 309, indoor speaker 311, outdoor speaker 313, authentication sensor 318, and seat occupancy sensor 310. The input/output devices are connected to vehicle computer 302 using one or more internal networks. The input/output devices and vehicle computer 302 work in collaboration to monitor the environment surrounding or within autonomous vehicle 112a, to authenticate passengers, and/or to maintain a communication session between remote human operators and vehicle passengers. In some examples, vehicle computer 302 can maintain passenger list 312 storing identity and trip information for each passenger.

Indoor camera 304 is a camera located within autonomous vehicle 112a responsible for monitoring the interior environment. For example, indoor camera 304 can capture images or videos in one or both of the visible or IR spectrum. One or more indoor cameras 304 can be strategically positioned inside the vehicle to capture the entire vehicle interior in camera's field of view.

In some implementations, the captured image data is sent to vehicle computer 302 for analysis. For example, vehicle computer 302 can use machine learning methods to analyze the captured image data to identify passengers or objects. Vehicle computer 302 can calculate the number of passengers and identify passengers inside the vehicle using facial recognition technology. In another example, vehicle computer 302 can alert passengers and cause autonomous vehicle 112a to stop if one or more prohibited objects such as weapons are detected inside the vehicle.

In some implementations, the captured data is sent to a remote server/cloud-based service for analysis using a network, e.g., network 106 in FIG. 1. The remote server/cloud-based service can send instructions to autonomous vehicle 112a based on the analysis results.

Indoor microphone 306 an audio recorder located within autonomous vehicle 112 responsible for capturing audio signals. Audio signals can include passengers' public conversations, passengers' vocal requests for assistance, or ambient sounds.

In some implementations, the captured audio data is sent to vehicle computer 302 for analysis. Vehicle computer 302 can provide instructions to autonomous vehicle 112a based on the analysis result. For example, if indoor microphone 306 detects a passenger's vocal request for assistance, vehicle computer 302 can cause a remote human tele-operator to start a live communication session with passengers inside the vehicle.

The captured data, e.g., image data or audio signals, are not permanently stored and no personal identifying information is stored or transmitted in compliance with local laws and regulations.

Indoor display 308 and indoor speaker 311 are output devices located within vehicle 112a responsible for broadcasting video and audio information. For example, the visual and audio information can keep passengers informed of the trip progress, including but not limited to current location, estimated arrival time, traffic condition, etc. In another example, indoor display 308 and indoor speaker 311 can play entertainment information such as movies or third-party sponsored messages such as infomercials. In another example, indoor display 308 can include PC-type tablets with separate or integrated touch ID devices.

In some implementations, a remote human tele-operator starts a live communication session with passengers inside the vehicle using the various input/output devices. For example, the communication session can start in response to a passenger's request for help, or can be initiated by vehicle computer 302 based on a particular situation detected inside the vehicle. The communication session can be carried out using a wireless network, such as network 106 of FIG. 1.

Seat occupancy sensor 310 is responsible for detecting the presence of seated passengers inside autonomous vehicle 112a. For example, seat occupancy sensor 310 can detect passengers by measuring the level of pressure on each passenger seat, or a capacitive change caused by the presence of a passenger in the seat. Seat occupancy sensor 310 can include an array of pressure sensors, e.g., piezo-electric sensors, or capacitive or inductive sensors integrated into the passenger seat. For safety reasons, passengers can be required to remain seated while autonomous vehicle 112a is moving. Seat occupancy sensor 310 is connected to vehicle computer 302 to cause autonomous vehicle 112a to stop if one or more passengers are detected to have left seats while autonomous vehicle 112a is in motion.

In some implementations, vehicle computer 302 maintains passenger list 312 that records the number and identities of scheduled passengers for a trip. For example, passenger list 312 can record the location and time each passenger is scheduled to board and leave autonomous vehicle 112a. Passenger list 312 can also include data identifying each scheduled passenger, such as facial features, fingerprint information, voice profile, etc. In another example, passenger list 312 can record the identities of passengers who have boarded the vehicle.

Outdoor display 309, outdoor microphone 307, outdoor speaker 313, outdoor camera 305, and authentication sensor 318 are input/output devices located on the exterior of autonomous vehicle 112a. For example, outdoor display 309 can include one or more digital screens, projectors, or a set of LED lights that provide visual information to help passengers identify autonomous vehicle 112a. Outdoor speakers 313 can broadcast audio information to alert nearby passengers of the vehicle location. For example, outdoor speaker 313 can announce passenger names and schedule departing time when autonomous vehicle 112a arrives at a programmed boarding location.

In use, a passenger authenticates with vehicle 112a to unlock vehicle doors and board the vehicle. In some examples, the passenger can identify himself/herself using outdoor camera 305 and/or outdoor microphone 307. For example, outdoor camera 305 can capture an image of the passenger's face and send the data to vehicle computer 302 for analysis. Vehicle computer 302 can cause autonomous vehicle 112a to unlock if the captured facial features match those stored in passenger list 312. In another example, vehicle computer 112a can request the passenger to provide an audio sample by speaking to outdoor microphone 307, and can compare the detected sound profile with the sound profile stored in passenger list 312. In another example, the passenger can authenticate using authentication sensor 318 located on the exterior of vehicle 112a. Authentication sensor 318 can include a passcode to require a passenger to provide a correct passcode to unlock autonomous vehicle 112a. The passcode will be provided to the passenger on the passenger's mobile device when the passenger books an autonomous shared vehicle trip. In another example, authentication sensor 318 can include one or more biometric sensors such as fingerprint sensors.

In some implementations, the passenger uses a mobile device to authenticate with the vehicle. For example, the passenger can send the unique MAC address associated the mobile device to the vehicle for authentication. If the MAC address matches the one stored in passenger list 312, the vehicle unlocks and allows the passenger to board. In another example, the vehicle can perform authentication using beacon technology over Bluetooth or other wireless technologies. In another example, the passenger can first provide information, e.g. biometric information, on the mobile device, and the mobile device can send the provided passenger information to the vehicle for authentication using short-range communication technology. Example biometric information can include any metrics related to human characteristics, such as fingerprint, palm vein, face recognition, DNA, palm print, hand geometry, iris recognition, retina, scent, etc. Fingerprint can be collected via a touch ID device being part of the mobile device, a tablet PC, or any standalone device.

Example Processes

FIGS. 2A-2C show an example process 200 of passenger 116a requesting autonomous vehicle 112a using mobile device 114a, according to an embodiment. During this process, mobile device 114a sends user-specified trip information to a remote server/cloud-based service responsible for coordinating and dispatch autonomous vehicles. The trip information can include passenger identity, trip starting/ending time, trip starting/ending location, special accommodation, payment information, etc.

FIGS. 2A-2B show passenger 116a entering trip information into mobile device 114a. Passenger 116a can enter trip information to a client application executing on mobile device 114a. For example, the client application can automatically collect passenger information stored in mobile device 114a, including identity information of passenger 116a, payment information, calendar events, current location etc. Mobile device 114a can then send the collected information using a cellular network to a remote server/cloud-based service responsible for managing autonomous vehicle taxi service. Mobile device architecture is described in more detail below with respect to FIG. 7.

FIG. 2C is an example autonomous vehicle 112a waiting for passenger 116a to board. After passenger 116a sends trip information using mobile device 114a to the remote server/cloud-based service, the server/service selects autonomous vehicle 112a and causes it to navigate autonomously to a location in a time window specified in the trip information. Upon arrival, autonomous vehicle 112a can identify itself, such as by sending an alert to mobile device 114a. Autonomous vehicle 112a can request passenger 116a to identify himself/herself before opening vehicle door. For example, passenger 116a can authenticate by entering information into mobile device 114a or by entering information directly into autonomous vehicle 112a. Autonomous vehicle architecture is described in details in FIG. 6 and related descriptions.

Figure 4:
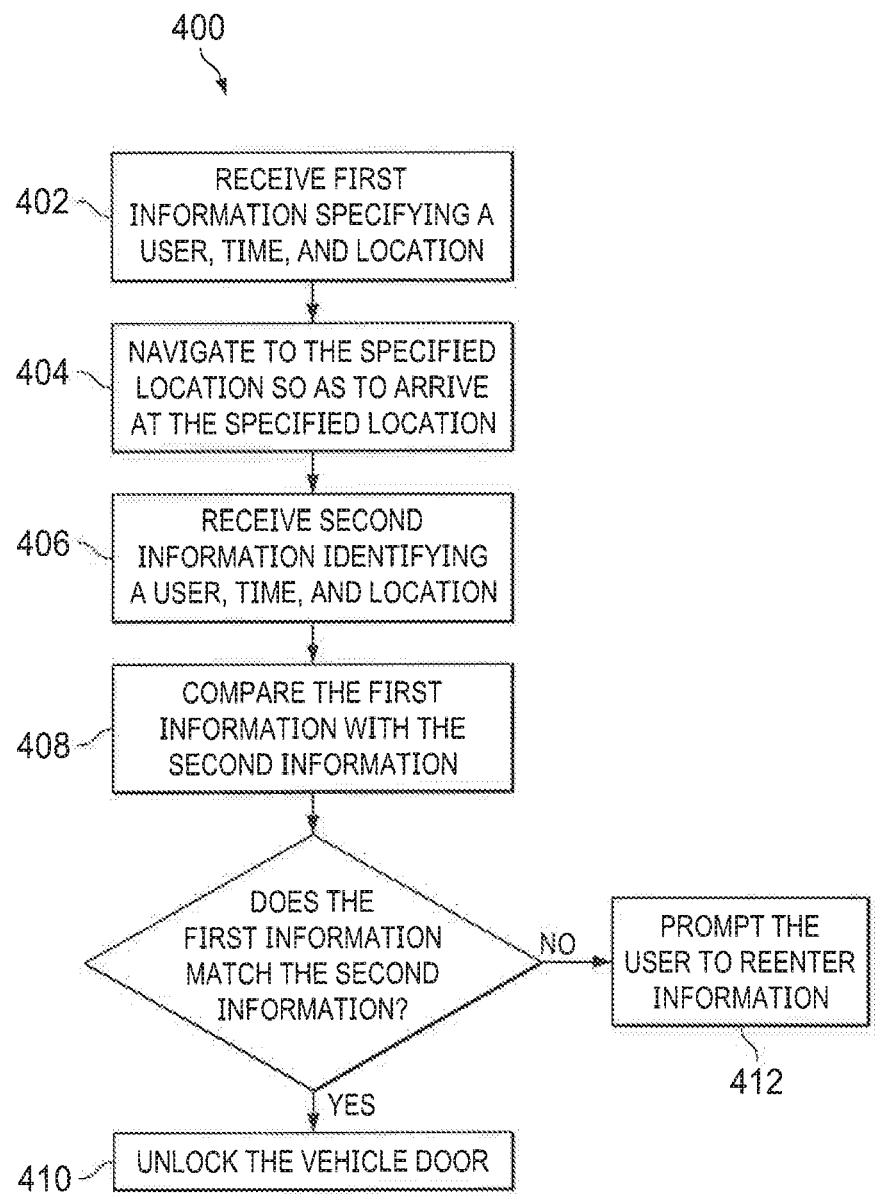
FIG. 4 is an example process for identifying and authenticating passengers outside an autonomous vehicle, according to an embodiment.

FIG. 4 is an example process 400 for identifying and authenticating passengers outside an autonomous vehicle, according to an embodiment. The autonomous vehicle will remain locked upon arrival to ensure the security of passengers inside.

The autonomous vehicle receives first information specifying a user, time, and location (402). For example, the autonomous vehicle can receive the first information from a server/cloud-based service through a communication channel, e.g. network 106 as shown in FIG. 1. The first information can be sent to the server/cloud-based service by a mobile device through the same communication channel.

In some implementations, the user included in the first information is an identity of a passenger, such as the passenger's name, biometric information, mobile device identification number, etc. The autonomous vehicle can store the passenger's identity in a local database, and constructs or updates passenger list 312 (FIG. 3) using the first information. For example, biometric information can include any metrics related to human characteristics, such as fingerprint, palm vein, face recognition, DNA, palm print, hand geometry, iris recognition, retina, scent, etc.

In some implementations, the time included in the first information is a time window, and the vehicle is requested by the passenger to arrive at the location included in the first information within the time window.

Using the received first information, the vehicle navigates to a geographic area so as to arrive at the specified location (404). The geographic area is an area surrounding the specified location such that the passenger can walk to the vehicle within a reasonable amount of time from any point in the geographic area. For example, the vehicle computer can compute the fastest path to arrive at a stopping location in the geographic area, taking into consideration the current traffic condition.

In some implementations, the vehicle uses visual and audio information to identify itself after having arrived at the stopping location in the geographic area. As a result, waiting passengers can make sure the vehicle is the expected vehicle. For example, the vehicle can use outdoor display 309 (FIG. 3) or outdoor speaker 313 (FIG. 3) to alert the waiting passenger. In another example, the vehicle can project trip information onto the vehicle window surfaces and/or on the ground outside the vehicle before opening vehicle doors. In another example, the vehicle can send a message to the passenger's mobile device including the vehicle's stopping location and trip information.

At the stopping location in the geographic area, the vehicle receives second information identifying a user, time and location (406). As the passenger approaches the vehicle, the vehicle will remain locked and prompts the passenger to authenticate to prevent unauthorized access to the vehicle. For example, the vehicle can prompt the passenger to enter the second information on the mobile device including the passenger's identification, destination, and scheduled arrival time. The vehicle can receive the second information from the mobile device using a short-range communication technology such as Bluetooth, NFC, infrared communication, modulated light pulse, etc. The passenger's identification information can include the passenger's biometric information such as fingerprints or facial features, or a passcode that was specially created for the trip.

Short-range communication technology is suited to the purpose of authentication (e.g., compared to satellite-based GPS service or other location-based services such as WiFi). For example, short-range communication technology is more reliable in areas with obstructions such as tall buildings or heavy clouds. In such areas, cellular communication may have coverage problems and Global Navigation Satellite Systems can be out of direct sight resulting in inaccurate coordinates. Short-range communication technology is available in all most all mobile devices. Additionally, a MAC address is unique to a mobile device, and so it is possible to identify a passenger based on his/her possession of the mobile device. Short-range communication technology is also more accurate given that the passenger must be in proximity to the vehicle to unlock vehicle doors (and cannot be, for example, many kilometers or miles away).

In some implementations, instead of using the mobile device to authenticate, the vehicle directly collects information about the passenger using one or more sensors. For example, the vehicle can authenticate a passenger directly using outdoor camera 305 (FIG. 3), outdoor microphone 307 (FIG. 3), and/or authentication sensor 318 (FIG. 3).

In some implementations, the passenger authenticates by showing a visual pattern such as a barcode or a QR code on the mobile device to outdoor camera 305 (FIG. 3). The visual pattern will be sent to the mobile device when the vehicle is reserved for the trip.

In some implementations, the authentication is programmed to happen within a time window and inside a geo-fence. For example, the time window can be set to be 5 minutes and the geo-fence can be a circle centered at the stopping location with a radius of 100 feet. The vehicle will leave the stopping location if the passenger fails to authenticate within 5 minutes or if the passenger is trying to authenticate more than 100 feet away. If the passenger has trouble authenticating, he/she can request help by initiating a live communication session with a remote human tele-operator using the vehicle's exterior input/output devices.

The vehicle compares the first information with the second information (408). The vehicle can use vehicle computer 302 (FIG. 3) to compare the collected second information with the first information received from the remote server/cloud-based service to prevent unauthorized use of the autonomous shared vehicle.

If the first information matches the collected second information, the vehicle unlocks its door and allows the passenger to enter the vehicle (410). For example, if the detected passenger facial features are the same as those stored in passenger list 312 (FIG. 3), or the user-entered passcode is the same as the one the vehicle has received from the server/cloud-based service, the authentication succeeds and the vehicle unlocks. Opening vehicle doors only when the passenger is authenticated ensures the proper vehicle/passenger match, improves the fleet efficiency and passenger security, and prevents unauthorized use of the vehicle.

If the first information does not match the collected second information, the vehicle prompts the user to re-enter information (412). In some implementations, the user has a limited number of tries. If the passenger fails to authenticate within the number of allowed tries, the vehicle will stop accepting new attempts and cause a virtual assistant, e.g., a remote human tele-operator, to assist the passenger. For example, after the human tele-operator manually authenticates the passenger, the human tele-operator can send a command including a passcode to the vehicle. If the vehicle successfully authenticates the passcode, the vehicle then executes the command, e.g., unlocking vehicle doors. The command and the passcode can be sent to the vehicle using radio frequency beacons or wireless transceivers from another vehicle. In some examples, the passcode is given to certified first responders such as firefighters or police officers to unlock the vehicle in case of emergency. In another example, the vehicle will leave the stopping location if the passenger fails to authenticate within the given number of attempts or within a specified time window. The vehicle will send a message to the passenger's mobile device to notify the passenger of the failure, and prompt the passenger to make a new reservation.

Figure 5:
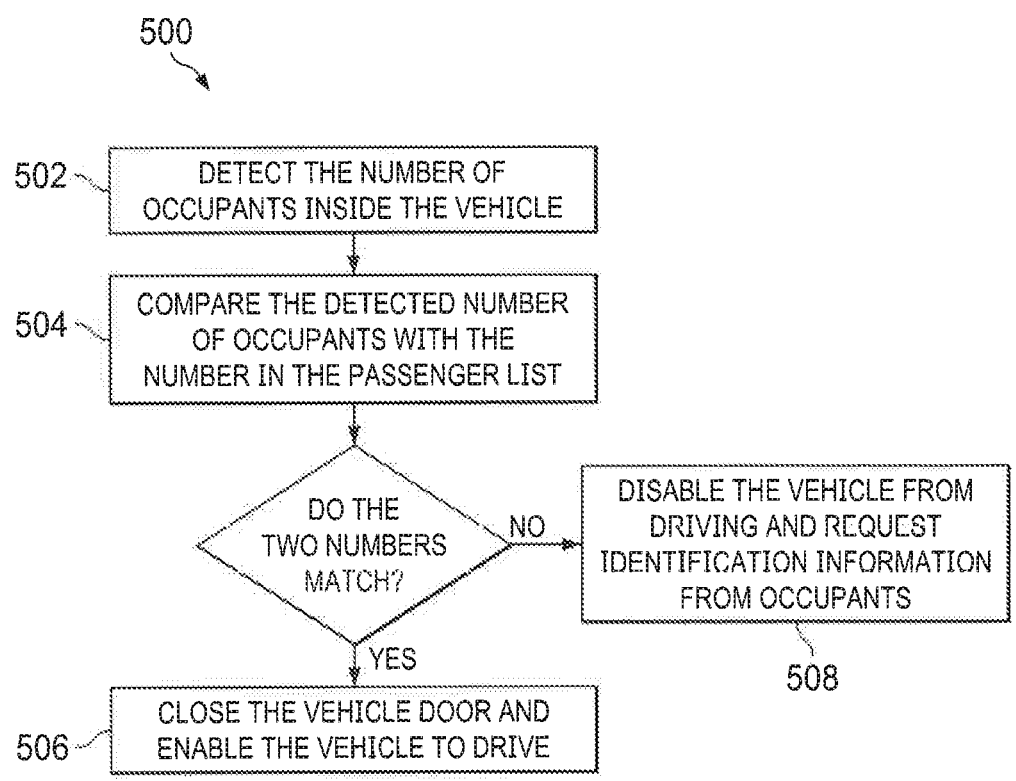
FIG. 5 is an example process for identifying and authenticating passengers inside an autonomous vehicle, according to an embodiment.

FIG. 5 is an example process 500 for identifying and authenticating passengers inside an autonomous vehicle, according to an embodiment.

The vehicle detects the number of occupants inside the vehicle (502). After the vehicle allows new passengers to enter, the vehicle initiates a process to count the number of passengers within. For example, the vehicle can use indoor camera 304 (FIG. 3) and vehicle computer 302 (FIG. 3) to perform image analysis to count the number of passengers. In another example, the vehicle can use the signals sent by seat occupancy sensors 310 (FIG. 3) to detect the number of passengers.

The vehicle compares the detected number of occupants with the number of scheduled passengers (504). For example, the number of scheduled passengers can be stored in passenger list 312 (FIG. 3). Passenger list 312 (FIG. 3) can store the scheduled number of passengers inside the vehicle at different times and different locations.

If the detected number of passengers matches the number of passengers stored in passenger list 312 (FIG. 3), the vehicle will re-lock to continue the trip and drive to the next scheduled destination (506).

In some implementations, the vehicle shares the authenticated occupancy information with other services or passenger-designated contacts. For example, the vehicle can inform a passenger's contact that the passenger is in the vehicle and on-route to a scheduled destination.

In some implementations, the vehicle will not only count the number of passengers, but also detect the identity of present passengers using the interior input devices such as indoor camera 304 (FIG. 3). The vehicle will re-lock and drive to the next scheduled destination if the detected passenger identities match the scheduled passenger identities. The autonomous taxi service can use the detected identity of the passenger to automatically debit the fare from the passenger's pre-established account.

If the detected number of passengers does not match the number of passengers stored in passenger list 312 (FIG. 3), the vehicle will be disabled from driving and request identification information from passengers (508). For example, the vehicle can request each passenger to enter a passcode in the mobile device to identify any missing passengers. In another example, the vehicle can initiate a communication session between the passengers and a remote human tele-operator to identify if any unauthorized passengers are inside the vehicle. The vehicle can also send an alert to nearby ground staff to come and assist the situation. The vehicle can remain unlocked during the whole process to ensure passenger safety inside the vehicle.

In some implementations, a passenger has left the vehicle with an intention to return at a later time. For example, the passenger may have temporarily left the vehicle to use a nearby restroom. The vehicle can automatically detect passengers leaving the vehicle using one or more sensors, e.g., indoor camera 304 (FIG. 3), outdoor camera 305 (FIG. 3), etc. The vehicle can then send a message to the mobile device associated with the passenger to request the passenger to return to the vehicle within a specified time period. In some examples, the vehicle can display the message on the windows or other surface areas of the vehicle. If the passenger fails to return, the vehicle can update passenger list 312 (FIG. 3) to reflect the actual passengers boarded the vehicle and leave the stopping location.

FIG. 8 is an example process for multi-stage passenger identification, according to an embodiment.

The autonomous vehicle receives a ride order from one or more passengers (802). For example, a ride reservation system, e.g., autonomous shared vehicle service 102 (FIG. 1), can first receive a ride request from a passenger's mobile device. The ride request can include information such as the number of passengers for the ride, the identity of each passenger, passenger mobile device MAC address (or other unique identifiers), the pickup location, the destination, the pickup time, etc. The ride reservation system can send the information in the ride request to the autonomous vehicle using second communication channel 120*a* (FIG. 1).

After receiving the ride order, the autonomous vehicle arrives in proximity to collect passengers (804). For example, the autonomous vehicle can stop at a feasible stopping location in proximity to the pickup location. For example, a location is feasible if the autonomous vehicle can physically navigate to the location and legally stop at the location. In another example, a location is feasible if the passengers can walk to the stopping location from the pickup location within a specified period of time. In another example, a location is feasible if stopping at the location is free of charge. Once arrived, the autonomous vehicle can send messages or use visual signals to convey its location to the passengers.

At the feasible stopping location, the autonomous vehicle monitors other short-range communication technology in proximity (806). Example short-range communication technology includes Bluetooth, near-field communication (NFC) technology, infrared, etc. The taxi reservation system can send a message to cause the passenger's mobile device to turn on the corresponding short-range communication technology. The autonomous vehicle can scan for mobile devices in proximity using the same short-range communication technology.

When passengers approach the autonomous vehicle, the autonomous vehicle detects passengers' mobile devices and unlocks (808). For example, the autonomous vehicle can previously receive identity for each mobile device such as MAC address from the taxi reservation service. When a mobile device with the appropriate MAC address is within a certain distance to the autonomous vehicle as determined by the short-range communication signals strength, the autonomous vehicle can unlock its doors and allow passengers to enter the vehicle. In another example, the autonomous vehicle can use beacon technology over Bluetooth or other wireless technologies to perform the passenger detection.

After passengers enter the autonomous vehicle, the autonomous vehicle requests that passengers confirm their identities inside the vehicle (810). Once the passenger enters the vehicle, the autonomous vehicle can request the passenger to confirm their identification. For example, the passenger can provide an input to the mobile device such as a passcode or biometric information. In another example, the passenger can use one or more input devices mounted inside the autonomous vehicle such as cameras or microphones to complete the authentication.

If the authentication is successful, the autonomous vehicle leaves for the programmed destination (812).

FIG. 9 is an example process for passengers to identify an autonomous vehicle at a pickup location, according to an embodiment.

Once the autonomous vehicle arrives in a region around the pickup location, it can look for a temporary stopping place to wait for the passengers. The autonomous vehicle can identify itself to the passengers using different communication means to reduce wait time. The methods described below can be used jointly or alternatively.

After arriving in the region around the pickup location, the autonomous vehicle displays identification messages on vehicle surfaces (902). The identification messages can include identification information such as the passenger's names or vehicle plate number. For example, the autonomous vehicle can display the identification messages on vehicle windows using built-in projectors from inside the autonomous vehicle. In another example, the display can be achieved using special display films placed on the vehicle surface or integrated window display technology.

After arriving in the region around the pickup location, the autonomous vehicle projects identification messages on nearby ground surfaces (904). For example, the autonomous vehicle can display the messages using one or more projectors to the ground surfaces next to its doors or to the front-end hood area.

After arriving in the region around the pickup location, the autonomous vehicle turns on short-range communication signals (906). In additional to providing visual messages to passengers, the autonomous vehicle can identify itself using short-range communication technology such as Bluetooth. For example, a mobile device can first receive the autonomous vehicle's unique MAC address from the taxi reservation service. After arriving at the stopping location, the autonomous vehicle can enter a Bluetooth discoverable mode so that a nearby the mobile device can detect and recognize the autonomous vehicle's unique MAC address.

The autonomous vehicle sends messages to passengers' mobile devices (908). The autonomous vehicle can cause messages to be sent to passengers' mobile devices to report the vehicle's location. For example, the taxi reservation service can send the message using second communication channel 120*a* (FIG. 1). In some examples, the message can be a location message including a real-time broadcast of the autonomous vehicle's location, e.g., using GPS technology. In another example, the message can cause the mobile device to enable discovery mode until the detection of the autonomous vehicle's MAC address.

Example Autonomous Vehicle System

Figure 6:
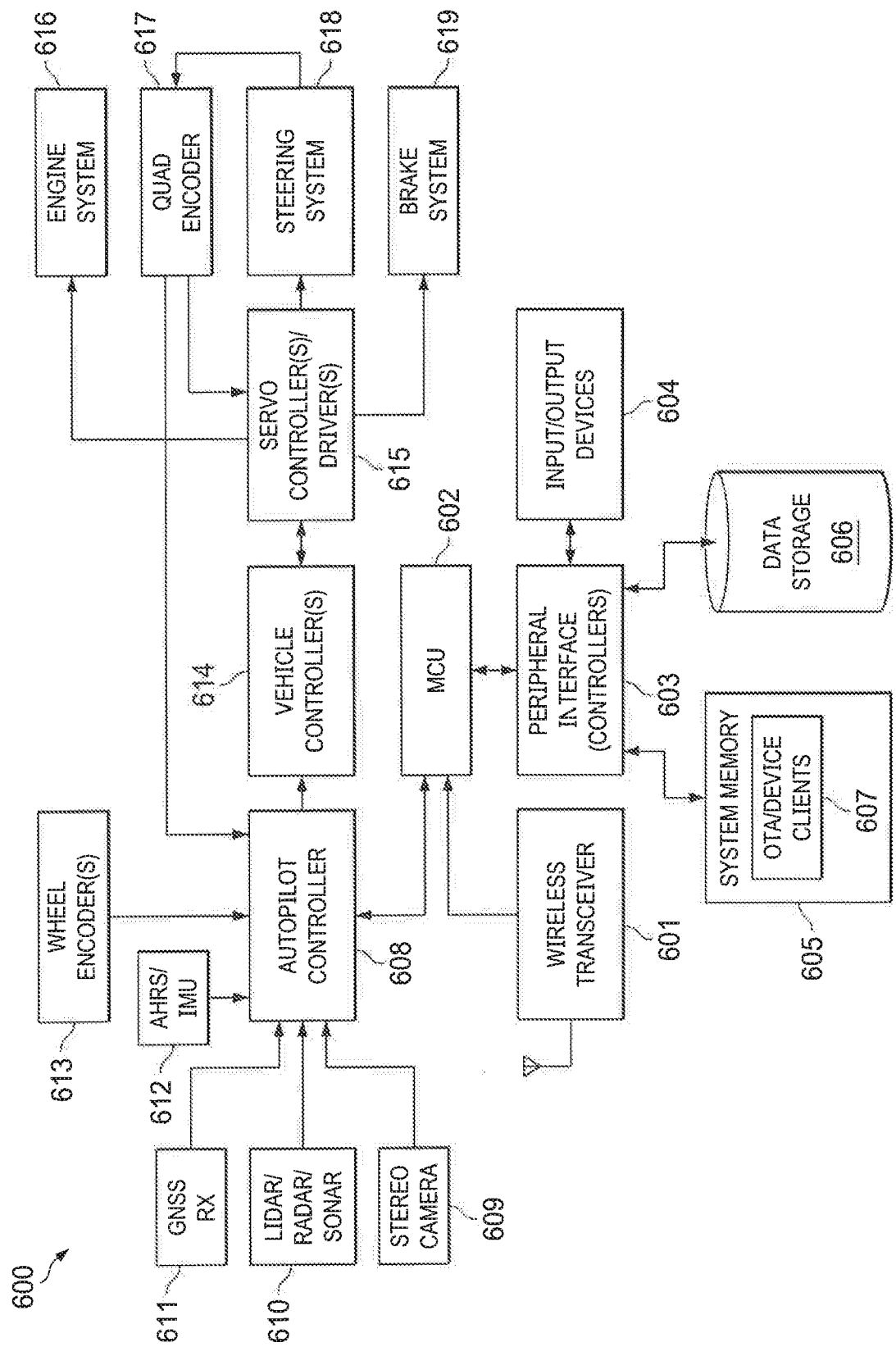
FIG. 6 is a block diagram of an autonomous vehicle architecture, according to an embodiment.

FIG. 6 is a block diagram of a self-driving vehicle system 600, according to an embodiment. System 600 is one example of a system topology and other systems may contain more or fewer components or subsystems.

System 600 includes wireless transceiver (TX) 601, microcontroller unit (MCU) 602, peripheral interface 603, input/output devices 604, system memory 605, data storage 606, OTA/device clients 607, autopilot controller 608, stereo camera 609, LiDAR 610, GNSS receiver 611, attitude and heading reference system (AHRS) 612, wheel encoder(s) 613, vehicle controller(s) 614, servo controller(s)/drivers(s) 615, engine system 616, quad encoder 617, steering system 618 and brake system 619. All of these system components coupled to one or more buses/networks, including but not limited to: a CAN bus, FlexRay™ and Ethernet. Different types of busses/networks (e.g., that use different bus/network protocols) can be coupled together using gateways that can translate or map between the different bus/network protocols.

Wireless TX 601 includes a radio frequency (RF) transmitter and receiver for transmitting and sending messages using OTA service provisioning (OTASP), OTA provisioning (OTAP) or OTA parameter administration (OTAPA). Wireless transmissions (e.g., messages) can be sent and received using any known wireless communication protocol, including but not limited to: OTA, OMA-DM, 2 G, 3 G, 5 G, IEEE 802.15.4, WiFi, ZigBee, Bluetooth, etc.

MCU 602 is a centralized processor that is coupled to wireless TX 601 and is responsible for accessing data stored in system memory 605 and data storage 606 through peripheral interface 603. Peripheral interface 603 can include one or more I/O controllers and are coupled to input/output devices 604, including display screens (e.g., LCD, LED, OLED, touch screens, surfaces or pad), pointing devices, switches, buttons and any other mechanical or virtual input/output mechanisms. The I/O controllers are configured or programmed to send and receive commands and/or data (unidirectional or bi-directional) over synchronous or asynchronous buses/interfaces, including full-duplex, half-duplex, master/slave, multi-master, point-to-point or peer, multi-drop and multi-point buses/interfaces.

In an embodiment, system memory 605 (e.g., RAM, ROM, Flash) stores instructions to be executed by MCU 602, including an operating system and applications. System memory 605 store OTA/device clients 607 for facilitating OTA service, as discussed in reference to FIG. 3.

MCU 602 is coupled to autopilot controller 608. Autopilot controller 608 is responsible for receiving and processing sensor data from stereo camera 609, LiDAR/Sonar 610, GNSS RX 611, AHRS 612, and generating autopilot commands based on analysis of the sensor data. AHRS 612 includes sensors on three axes that provide attitude and heading information for the vehicle, including roll, pitch and yaw in a suitable reference coordinate frame. The sensors can be either solid-state or microelectromechanical systems (MEMS) gyroscopes, accelerometers and magnetometers. In an embodiment, a non-linear estimator, such as an Extended Kalman filter is used to compute a navigation solution from data provided by AHRS 612. Other sensors can be included in system 600 including but not limited to temperature sensors, pressure sensors and ambient light sensors.

GNSS RX 611 can be any satellite-based positioning system receiver, including but not limited to: Global Positioning System (GPS), GLONASS, Galileo and BeiDou. Other position technologies include WiFi positioning (e.g., using WiFi fingerprint database and Bayes' predictor) and cell towers (e.g., using trilateration, time of flight (TOF), angle of arrival (AOA)).

As part of receiving and processing sensor data, autopilot controller uses various AI technologies for routing and collision avoidance. An example technology is Bayesian Simultaneous localization and mapping (SLAM) algorithms, which fuse data from multiple sensors and an off-line map into current location estimates and map updates. Another example, is SLAM with detection and tracking of other moving objects (DATMO), which also handles cars and pedestrians. Less complex systems may use roadside real-time locating system (RTLS) beacon systems to aid localization. Another example is visual object recognition using machine vision, including deep learning or neural networks having multiple stages or levels in which neurons are simulated from the environment that activate the network. The neural network can be trained on data extracted from real life driving scenarios. The neural network is activated and "learns" to perform the best course of action based on the driving scenarios.

Vehicle controller(s) 614 can include TCUs, ECUs and any controller that is used to control a vehicle subsystem. Vehicle controller (s) 614 receives command from autopilot controller 608 and generates control commands to server controller(s)/driver(s) 615 for controlling/driving various vehicle subsystems, including but not limited to: engine system 616, steering system 618 and brake system 619.

In addition to sensors, system 600 includes various encoders, including quad encoder 617 for measuring steering angles and wheel encoder 613 for measuring wheel rotations. Encoders 613, 617 provide output to autopilot controller 608 to be factored into is computations.

Exemplary Mobile Device Architecture

Figure 7:
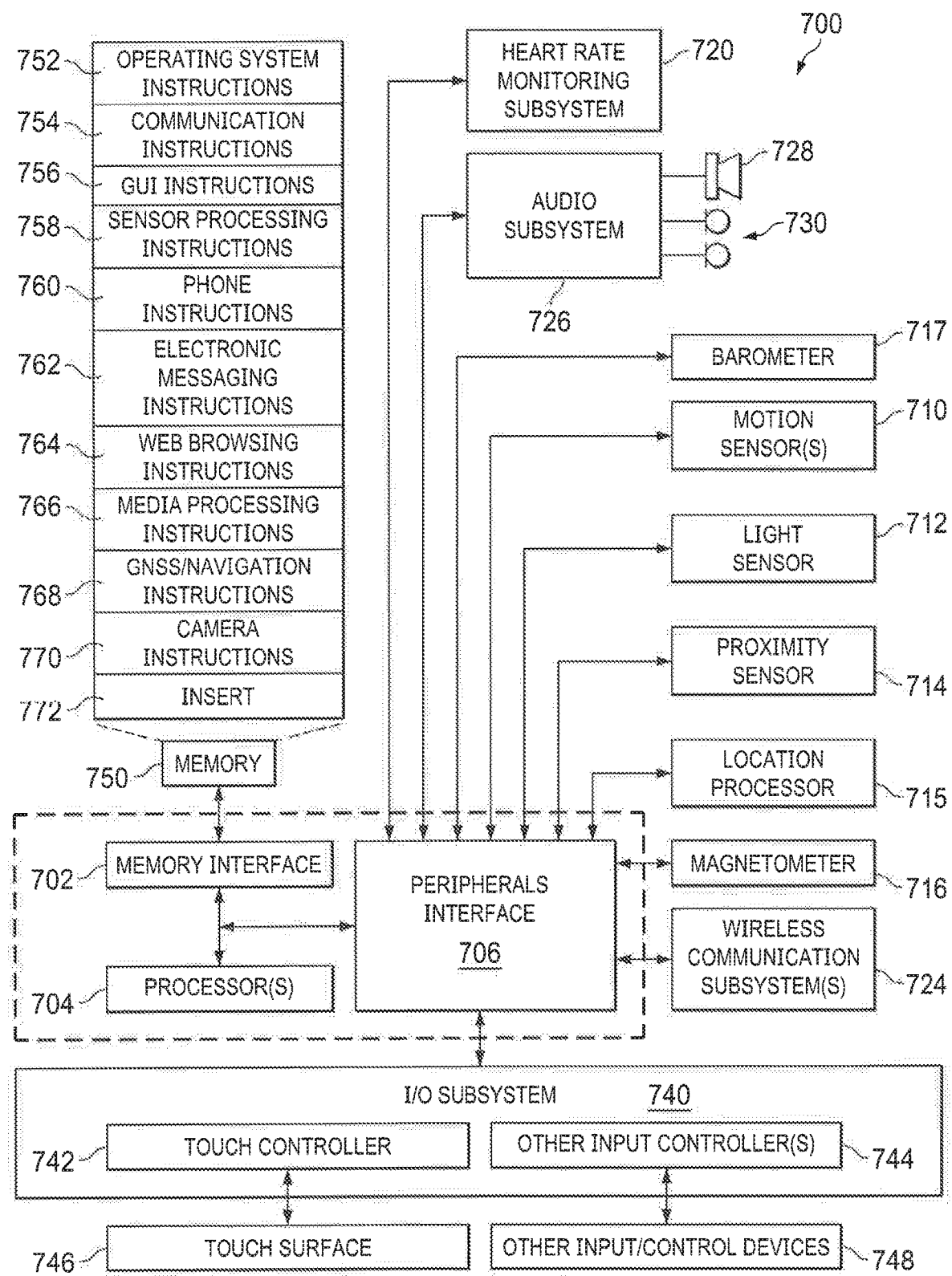
FIG. 7 is a block diagram of a mobile device architecture, according to an embodiment.

FIG. 7 illustrates example wearable computer architecture 700 implementing the features and operations described in reference to FIGS. 1-6. Architecture 700 can include memory interface 702, one or more data processors, image processors and/or processors 704 and peripherals interface 706. Memory interface 702, one or more processors 704 and/or peripherals interface 706 can be separate components or can be integrated in one or more integrated circuits.

Sensors, devices, and subsystems can be coupled to peripherals interface 706 to provide multiple functionalities. For example, one or more motion sensors 710, light sensor 712 and proximity sensor 714 can be coupled to peripherals interface 706 to facilitate motion sensing (e.g., acceleration, rotation rates), lighting and proximity functions of the wearable computer. Location processor 715 can be connected to peripherals interface 706 to provide geopositioning. In some implementations, location processor 715 can be a GNSS receiver, such as the Global Positioning System (GPS) receiver. Electronic magnetometer 716 (e.g., an integrated circuit chip) can also be connected to peripherals interface 706 to provide data that is used to determine the direction of magnetic North. Electronic magnetometer 716 can provide data to an electronic compass application. Motion sensor(s) 710 can include one or more accelerometers and/or gyros configured to determine change of speed and direction of movement of the wearable computer. Barometer 717 can be configured to measure atmospheric pressure around the mobile device. Heart rate monitoring subsystem 720 can be configured to measure the heartbeat of a user who is wearing the computer on their wrist. In an embodiment, subsystem 720 includes LEDs paired with photodiodes for measuring the amount of light reflected from the wrist (not absorbed by the wrist) to detect a heartbeat.

In an embodiment, one or more image capture devices are coupled to peripherals interface 706, such as a digital camera that can capture digital images, video and a depth sensor that that can capture depth data for localization (e.g., visual odometry), object detection, facial recognition, augmented reality (AR), virtual reality (VR) and other applications. In an embodiment, a light detecting and ranging (LIDAR) sensor or an infrared depth sensor is coupled to peripherals interface 706 for generating depth data.

In an embodiment, one or more image capture devices are coupled to peripherals interface 706, such as a digital camera that can capture digital images, video and depth data for localization, object detection and other applications. In an embodiment, a light detecting and ranging (LIDAR) sensor and/or infrared depth sensor is coupled to peripherals interface 706 for generating depth that can be used for a variety of applications, such as constructing three-dimensional (3D) images for augmented reality (AR), virtual reality (VR) and facial recognition applications.

Communication functions can be facilitated through wireless communication subsystems 724, which can include radio frequency (RF) receivers and transmitters (or transceivers) and/or optical (e.g., infrared) receivers and transmitters. The specific design and implementation of the communication subsystem 724 can depend on the communication network(s) over which a mobile device is intended to operate. For example, architecture 700 can include communication subsystems 724 designed to operate over a GSM network, 3 G, 4 G, 5 G, a GPRS network, an EDGE network, a WiFi network, near field (NF) and a Bluetooth network. In particular, the wireless communication subsystems 724 can include hosting protocols, such that the mobile device can be configured as a base station for other wireless devices.

Audio subsystem 726 can be coupled to a speaker 728 and one or more microphones 730 to facilitate voice-enabled functions, such as voice recognition, voice replication, digital recording and telephony functions. Audio subsystem 726 can be configured to receive voice commands from the user.

I/O subsystem 740 can include touch surface controller 742 and/or other input controller(s) 744. Touch surface controller 742 can be coupled to a touch surface 746. Touch surface 746 and touch surface controller 742 can, for example, detect touch contact and movement (gestures) or break thereof using any of a plurality of touch sensitivity technologies, including but not limited to capacitive, resistive, infrared and surface acoustic wave technologies, as well as other proximity sensor arrays or other elements for determining one or more points of contact with touch surface 746. Touch surface 746 can include, for example, a touch screen or the digital crown of a smart watch. I/O subsystem 740 can include a haptic engine or device for providing haptic feedback (e.g., vibration) in response to commands from processor 704. In an embodiment, touch surface 746 can be a pressure-sensitive surface.

Other input controller(s) 744 can be coupled to other input/control devices 748, such as one or more buttons, rocker switches, thumb-wheels, infrared ports, Thunderbolt® ports and USB ports. The one or more buttons (not shown) can include an up/down button for volume control of speaker 728 and/or microphone 730. Touch surface 746 or other controllers 744 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 746; and a pressing of the button for a second duration that is longer than the first duration may turn power to the mobile device on or off. The user may be able to customize a functionality of one or more of the buttons. The touch surface 746 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 702 can be coupled to memory 750. Memory 750 can include high-speed random access memory and/or non-volatile memory, such as one or more magnetic disk storage devices, one or more optical storage devices and/or flash memory (e.g., NAND, NOR). Memory 750 can store operating system 752, such as the iOS operating system developed by Apple Inc. of Cupertino, Calif. Operating system 752 may include instructions for handling basic system services and for performing hardware dependent tasks. In some implementations, operating system 752 can include a kernel (e.g., UNIX kernel).

Memory 750 may also store communication instructions 754 to facilitate communicating with one or more additional devices, one or more computers and/or one or more servers, such as, for example, instructions for implementing a software stack for wired or wireless communications with other devices. Memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Location instructions 768 to facilitate generic GNSS and location-related processes and instructions; and heart rate monitoring instructions 770 to facilitate heart rate monitoring. Memory 750 further includes indoor/outdoor detection instructions 772 for performing the features and processes described in reference to FIGS. 1-6. In an embodiment, sensor processing instructions 758 include a digital pedometer application that receives motion sensor data (e.g., acceleration data, angular rate data) and computes at least one of steps take, step frequency, stride length, user speed or distance traveled.

Each of the above identified instructions and applications can correspond to a set of instructions for performing one or more functions described above. These instructions can be implemented as separate software programs, procedures, or modules or as a single body of code. Memory 750 can include additional instructions or fewer instructions. Various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C #, Java), including compiled or interpreted languages, and it can be deployed in any form, including as a stand-alone program or as a module, component, subroutine, a browser-based web application, or other units suitable for use in a computing environment.

While this document contains many specific implementation details, the implementation details should not be construed as limitations on the scope of what may be claimed but rather as a description of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

While logic flows or operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various software components in the embodiments described above should not be understood as requiring such separation in all embodiments, and it should be understood that the described software components can generally be integrated together in a single software program or multiple software programs.

In some instances, functions in claims will be preceded with the phrase "one or more." The phrase "one or more" as used herein includes a function being performed by one element, a function being performed by more than one element, e.g., in a distributed fashion, several functions being performed by one element, several functions being performed by several elements, or any combination of the above.

In some instances, claim elements will be preceded with the terms first, second, third and so forth. It should be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context."

Some aspects of the subject matter of this specification may include gathering and use of data available from various sources. The present disclosure contemplates that in some instances, this gathered data may identify a particular location or an address based on device usage. Such personal information data can include location-based data, addresses, subscriber account identifiers, or other identifying information. The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure.

What is claimed is:

1. A method comprising:
  receiving, by a vehicle computer, first information specifying a user, a time, and a geographic location, the first information received by the vehicle computer from a first communication channel;
  causing an autopilot controller of the vehicle to navigate to the geographic location so as to arrive at the geographic location;
  at the geographic location:
    receiving, by the vehicle computer, second information identifying the individual, time, and geographic location, the second information received over a second communication channel different than the first communication channel the second information sent by a mobile device at the location;
    comparing, by the vehicle computer, the user, time, and geographic location of the first information with the user, time, and geographic location of the second information; and
    responsive to the comparing, causing, by the vehicle computer, one or more doors of the vehicle to unlock or open.

2. The method of claim 1, wherein the first information is received over-the-air (OTA) from a network-based OTA platform.

3. The method of claim 1, wherein the second communication channel comprises a Bluetooth communication channel.

4. The method of claim 1, wherein the second information includes biometric information that is generated by the mobile device at the geographic location and that uniquely identifies the user.

5. The method of claim 4, wherein the biometric information includes at least one of fingerprint or retina scan data or facial recognition data.

6. The method of claim 1, further comprising:
  detecting, by one or more sensors one or more occupants inside the vehicle;
  comparing, by the vehicle computer, the detected one or more occupants inside the vehicle with a passenger list;
  in accordance with the detected one or more occupants being different than the passenger list, disabling the vehicle from driving and initiating a request for third information from the one or more occupants of the vehicle;
  receiving, by the vehicle computer, the third information; and
  confirming, by the vehicle computer, the third information.

7. The method of claim 6, wherein the detecting includes one or more images captured by an image capture device inside the vehicle.

8. The method of claim 6, wherein the detecting includes analyzing audio captured by one or more microphones inside the vehicle.

9. The method of claim 6, wherein the detecting includes receiving signals from one or more seat occupancy sensors indicating that one or more seats in the vehicle are occupied.

10. The method claim 6, wherein the third information includes information collected from one or more wired or wireless input devices located inside the vehicle.

11. The method of claim 6, further comprising:
responsive to the third information, sending, by the vehicle computer, an alert to a teleoperator or network-based service.

12. The method of claim 6, further comprising:
responsive to confirming the third information, closing or locking the one or more doors of the vehicle and enabling the vehicle to drive.

13. The method of claim 1, further comprising:
detecting, by one or more sensors, one or more occupants inside the vehicle;
comparing, by the vehicle computer, the detected one or more occupants inside the vehicle with a passenger list; and
in accordance with the detected one or more occupants being the same as the passenger list, closing or locking the one or more doors of the vehicle and enabling the vehicle to drive.

14. The method of claim 1, further comprising:
determining, by the vehicle computer, that the vehicle has arrived at the geographic location; and
displaying fourth information on one or more windows of the vehicle or one or more surfaces to allow the user to visually identify the vehicle.

15. The method of claim 14, where the displaying includes using a projector to project the fourth information on the ground in front of the one or more doors.

16. The method of claim 1, further comprising:
determining, by the vehicle computer, that the vehicle has arrived at the geographic location; and
transmitting a message to the mobile device including fourth information to allow the user to visually identify the vehicle.

17. The method of claim 1, further comprising:
detecting, by one or more sensors, that the user has left the vehicle; and
updating, by the vehicle computer, a passenger list to reflect that the user has left the vehicle.

18. The method of claim 17, further comprising:
transmitting a message to the mobile device instructing the user to return to the vehicle within a specified time period;
displaying the message on one or more windows of the vehicle or one or more surfaces;
determining, by the vehicle computer, that the user has not returned to the vehicle within a specified time period; and
removing, by the vehicle computer, the user from the passenger list.

19. The method of claim 1, further comprising:
receiving, by the vehicle computer, a command from a teleoperator or first responder to unlock or open the one or more doors;
authenticating, by the vehicle computer, the command; and
responsive to the command being authenticated, unlocking or opening the one or more doors.

20. The method of claim 19, wherein the command is received from a radio frequency beacon or from another vehicle.

21. The method of claim 1, further comprising, at the geographic location and after the vehicle has navigated to the geographic location:
determining, by the vehicle computer, that a duration has expired since the vehicle arrived at the geographic location;
determining, by the vehicle computer, that the second information has not been received; and
in response to determining that the duration has expired and the second information has not been received, causing the vehicle to navigate away from the specified location.

22. The method of claim 1, further comprising identifying, based on a location processor of the vehicle, that the vehicle has arrived at the geographic location.

23. A vehicle comprising:
one or more sensors;
a vehicle computer;
memory storing instructions that when executed by the vehicle computer, cause the vehicle computer to perform operations comprising:
receiving, by a vehicle computer, first information specifying a user, a time, and a geographic location, the first information received by the vehicle computer from a first communication channel;
causing the vehicle to navigate to the geographic location so as to arrive at the geographic location at around the specified time;
at the geographic location:
receiving, by the vehicle computer, second information identifying the individual, time, and geographic location, the second information being received over a second communication channel that is different than the first communication channel, the second information being sent by a mobile device at the location;
comparing, by the vehicle computer, the user, time, and geographic location of the first information with the user, time, and geographic location of the second information; and
responsive to the comparing, causing, by the vehicle computer, one or more doors of the vehicle to unlock or open.

24. The vehicle of claim 23, wherein the first information is received over-the-air (OTA) from a network-based OTA platform.

25. The vehicle of claim 23, wherein the second communication channel is a Bluetooth communication channel.

26. The vehicle of claim 23, wherein the second information includes biometric information that is generated by the mobile device at the geographic location and that uniquely identifies the user.

27. The vehicle of claim 26, wherein the biometric information includes at least one of fingerprint or retina scan or facial recognition.

28. The vehicle of claim 23, further comprising:
detecting, by the one or more sensors one or more occupants inside the vehicle;
comparing, by the vehicle computer, the detected one or more occupants inside the vehicle with a passenger list;
in accordance with the detected one or more occupants being different than the passenger list, disabling the vehicle from driving and initiating a request for third information from the one or more occupants of the vehicle;
receiving, by the vehicle computer, the third information; and
confirming, by the vehicle computer, the third information.

29. The vehicle of claim 28, wherein the detecting includes one or more images captured by an image capture device inside the vehicle.

30. The vehicle of claim 28, wherein the detecting includes analyzing audio captured by one or more microphones inside the vehicle.

31. The vehicle of claim 28, wherein the detecting includes receiving signals from one or more seat occupancy sensors indicating that one or more seats in the vehicle are occupied.

32. The vehicle of claim 28, wherein the third information includes information collected from one or more wired or wireless input devices located inside the vehicle.

33. The vehicle of claim 28, the operations further comprising:
responsive to the third information, sending, by the vehicle computer, an alert to a teleoperator or network-based service.

34. The vehicle of claim 28, further comprising:
responsive to confirming the third information, closing or locking the one or more doors of the vehicle and enabling the vehicle to drive.

35. The vehicle of claim 23, the operations further comprising:
detecting, by one or more sensors, one or more occupants inside the vehicle;
comparing, by the vehicle computer, the detected one or more occupants inside the vehicle with a passenger list; and
in accordance with the detected one or more occupants being the same as the passenger list, closing or locking the one or more doors of the vehicle and enabling the vehicle to drive.

36. The vehicle of claim 23, the operations further comprising:
determining, by the vehicle computer, that the vehicle has arrived at the location; and
displaying fourth information on one or more windows of the vehicle or one or more surfaces to allow the user to visually identify the vehicle.

37. The vehicle of claim 36, where the displaying includes using a projector to project the fourth information on the ground in front of the one or more doors.

38. The vehicle of claim 23, further comprising:
determining, by the vehicle computer, that the vehicle has arrived at the location; and
transmitting a message to the mobile device including fourth information to allow the user to visually identify the vehicle.

39. The vehicle of claim 23, further comprising:
detecting, by the one or more sensors, that the user has left the vehicle; and
updating, by the vehicle computer, a passenger list to reflect that the user has left the vehicle.

40. The vehicle of claim 39, further comprising:
transmitting a message to the mobile device instructing the user to return to the vehicle within a specified time period;
displaying the message on one or more windows of the vehicle or one or more surfaces;
determining, by the vehicle computer, that the user has not returned to the vehicle within a specified time period; and
removing, by the vehicle computer, the user from the passenger list.

41. The vehicle of claim 23, further comprising:
receiving, by the vehicle computer, a command from a teleoperator or first responder to unlock or open the one or more doors;
authenticating, by the vehicle computer, the command;
responsive to the command being authenticated, unlocking or opening the one or more doors.

42. The vehicle of claim 41, wherein the command is received from a radio frequency beacon or from another vehicle.

43. A non-transitory, computer-readable storage medium having instructions stored thereon, that when executed by a vehicle computer, cause the vehicle computer to perform operations comprising:
receiving, by the vehicle computer, first information specifying a user, a time and a geographic location, the first information received by the vehicle computer from a first communication channel;
navigating to the geographic location so as to arrive at the specified location at around the specified time;
identifying, by a location processor of the vehicle, that the vehicle has arrived at the geographic location;
at the geographic location:
receiving, by the vehicle computer, second information identifying the individual, time and location, the second information being received over a second communication channel that is different than the first communication channel, the second information being sent by a mobile device at the location;
comparing, by the vehicle computer, the user, time, and geographic location of the first information with the user, time, and geographic location of the second information; and
responsive to the comparing, causing, by the vehicle computer, one or more doors of the vehicle to unlock or open.

44. The non-transitory computer-readable medium of claim 43, wherein the instructions for navigating to the geographic location comprise instructions for navigating, by an autopilot controller of the vehicle, to the geographic location.

* * * * *